US011900844B1

(12) United States Patent
Lin et al.

(10) Patent No.: US 11,900,844 B1
(45) Date of Patent: Feb. 13, 2024

(54) DISPLAY PANEL AND DISPLAY DEVICE FOR ABNORMAL DETECTION

(71) Applicant: AUO Corporation, Hsin-Chu (TW)

(72) Inventors: Fang-Yuan Lin, Hsin-Chu (TW); Chen-Chi Lin, Hsin-Chu (TW); Yu-Chieh Kuo, Hsin-Chu (TW); Cheng-Wei Lai, Hsin-Chu (TW)

(73) Assignee: AUO CORPORATION, Hsin-Chu (TW)

( * ) Notice: Subject to any disclaimer, the term of this patent is extended or adjusted under 35 U.S.C. 154(b) by 0 days.

(21) Appl. No.: 18/147,730

(22) Filed: Dec. 29, 2022

(30) Foreign Application Priority Data

Dec. 8, 2022 (TW) ................................ 111147266

(51) Int. Cl.
*G09G 3/00* (2006.01)

(52) U.S. Cl.
CPC ..... *G09G 3/006* (2013.01); *G09G 2300/0426* (2013.01); *G09G 2300/0819* (2013.01); *G09G 2300/0852* (2013.01); *G09G 2310/0202* (2013.01); *G09G 2310/08* (2013.01); *G09G 2330/12* (2013.01)

(58) Field of Classification Search
CPC ..................................................... G09G 3/006
See application file for complete search history.

(56) References Cited

U.S. PATENT DOCUMENTS 7,355,574 B1 4/2008 Leon et al.
2008/0036703 A1 2/2008 Wang et al.

FOREIGN PATENT DOCUMENTS

CN 102122490 A 7/2011
CN 107610653 A 1/2018

*Primary Examiner* — Gustavo Polo
(74) *Attorney, Agent, or Firm* — WPAT, P.C

(57) ABSTRACT

A display panel includes a data line and a pixel circuit under test. Pixel circuit under test is coupled to data line, and is configured to receive a first detecting signal from a detecting signal source and receive a second detecting signal from a pixel data signal source. Pixel circuit under test is configured to generate a driving current to read the first detecting signal and the second detecting signal so as to generate a detection result signal. Pixel circuit under test includes a luminous element and a bypass circuit. Luminous element is configured to emit a light according to the driving current. Bypass circuit is coupled to luminous element and data line, and is configured to transmit the detection result signal to detecting signal source through data line according to a test control signal so that detecting signal source determines whether pixel circuit under test is abnormal.

19 Claims, 6 Drawing Sheets

DISPLAY PANEL AND DISPLAY DEVICE FOR ABNORMAL DETECTION

CROSS-REFERENCE TO RELATED APPLICATION

This application claims priority to Taiwan Application Serial Number 111147266, filed on Dec. 8, 2022, which is herein incorporated by reference in its entirety.

BACKGROUND

Field of Invention

The present disclosure relates to an electronic detection device. More particularly, the present disclosure relates to a display panel and a display device.

Description of Related Art

Conventional test design of pixel circuits of a display panel of a display device is coupled to a system low voltage source. However, all pixel circuits in one row are coupled to a signal line of a system low voltage source. Then, if a certain pixel circuit in one row is abnormal, test results of all pixel circuits in one row will be abnormal. Therefore, it is impossible to determine an abnormal specific pixel circuit in a row.

For the foregoing reason, there is a need to provide other display panel and display device to solve the problems of the prior art.

SUMMARY

One aspect of the present disclosure provides a display panel. The display panel includes a data line and a pixel circuit under test. The pixel circuit under test is coupled to the data line, and is configured to receive a first detecting signal from a detecting signal source first detecting signal and receive a second detecting signal from a pixel data signal source. The pixel circuit under test is configured to generate a driving current to read the first detecting signal and the second detecting signal so as to generate a detection result signal. The pixel circuit under test includes a luminous element and a bypass circuit. The luminous element is configured to emit a light according to the driving current. The bypass circuit is coupled to the luminous element and the data line, and is configured to transmit the detection result signal to the detecting signal source through the data line according to a test control signal so that the detecting signal source determines whether the pixel circuit under test is abnormal.

Another aspect of the present disclosure provides a display device. The display device includes a display panel and a detecting signal source. The display panel includes a plurality of data lines, a plurality of gate lines, and a plurality of pixel circuits under test. The plurality of pixel circuits under test are coupled to the plurality of data lines and the plurality of gate lines respectively. The detecting signal source is coupled to each of the plurality of pixel circuits under test and the plurality of data lines of the display panel, and is configured to generate a first detecting signal to each of the plurality of pixel circuits under test so that each of the plurality of pixel circuits under test generates a detection result signal to the plurality of data lines according to the first detecting signal and a second detecting signal. The detecting signal source is configured to determine whether each of the plurality of pixel circuits under test is abnormal according to the detection result signal. If each of the plurality of pixel circuits under test is abnormal, the detecting signal source is configured to lock at least one of the pixel circuits under test which is abnormal according to a plurality of positioning points of the plurality of data lines and the plurality of gate lines.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
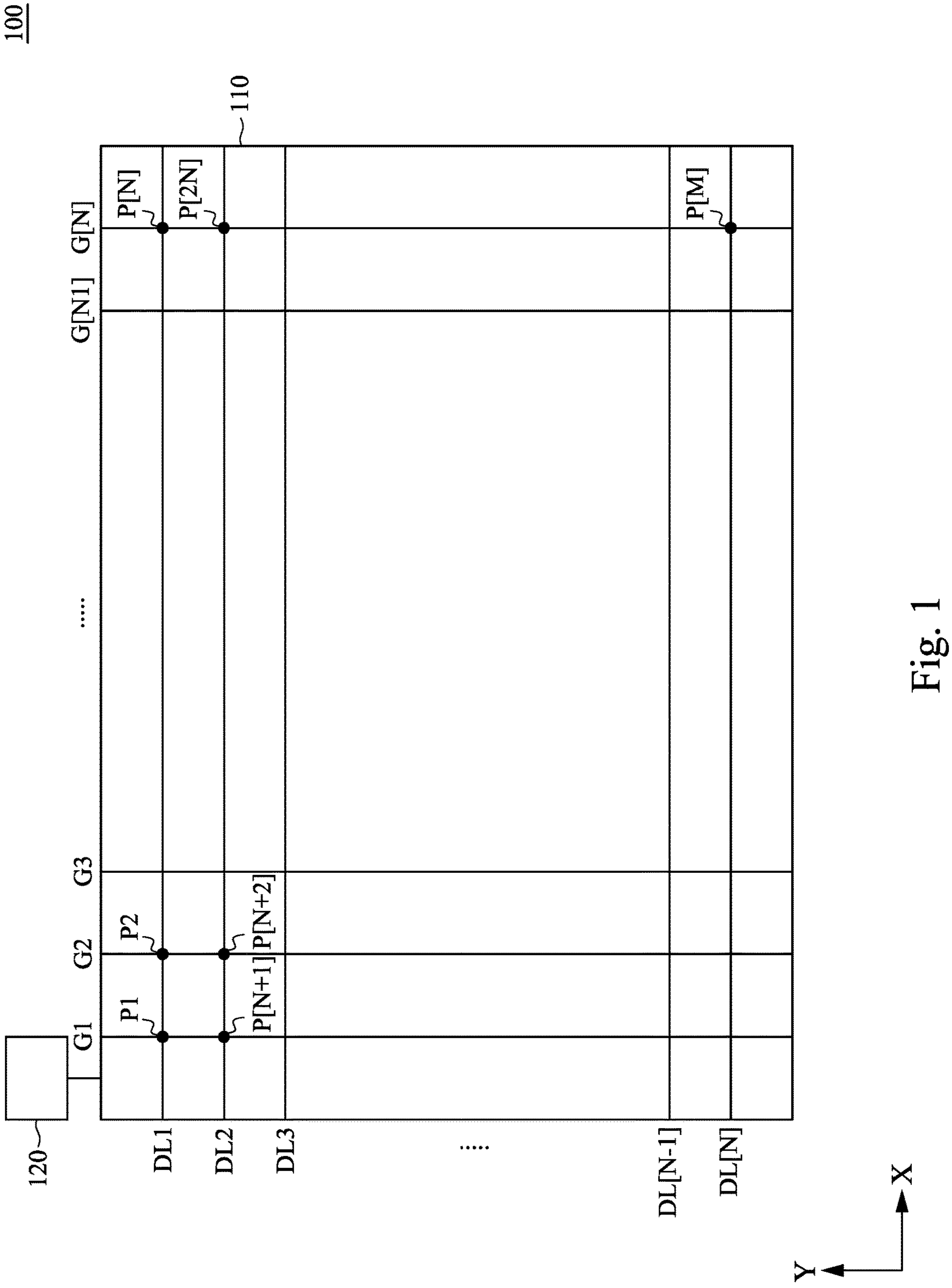
FIG. 1 depicts a schematic diagram of a display device according to some embodiments of the present disclosure.

Reference will now be made in detail to the present embodiments of the invention, examples of which are illustrated in the accompanying drawings. Wherever possible, the same reference numbers are used in the drawings and the description to refer to the same or like parts.

The terminology used herein is for the purpose of describing particular example embodiments only and is not intended to be limiting of the present disclosure. As used herein, the singular forms "a," "an" and "the" are intended to include the plural forms as well, unless the context clearly indicates otherwise.

Furthermore, it should be understood that the terms, "comprising", "including", "having", "containing", "involving" and the like, used herein are open-ended, that is, including but not limited to.

The terms used in this specification and claims, unless otherwise stated, generally have their ordinary meanings in the art, within the context of the disclosure, and in the specific context where each term is used. Certain terms that are used to describe the disclosure are discussed below, or elsewhere in the specification, to provide additional guidance to the practitioner skilled in the art regarding the description of the disclosure.

FIG. 1 depicts a schematic diagram of a display device 100 according to some embodiments of the present disclosure. In some embodiments, as shown in FIG. 1, the display device 100 includes a display panel 110 and a detecting signal source 120.

In some embodiments, the display panel 110 includes a plurality of data lines (e.g.: the plurality of data lines DL1~DL[N]), a plurality of gate lines (e.g.: the plurality of gate lines G1~G[N]), and a plurality of pixel circuits under test (e.g.: a pixel circuit under test P1~ a pixel circuit under test P[N], a pixel circuit under test P[N+1]~ a pixel circuit under test P[2N], and a pixel circuit under test P[M]).

Then, the plurality of pixel circuits under test (e.g.: a pixel circuit under test P1~ a pixel circuit under test P[N], a pixel circuit under test P[N+1]~ a pixel circuit under test P[2N], and a pixel circuit under test P[M]) are coupled to the plurality of data lines (e.g.: the plurality of data lines DL1-DL[N]) and the plurality of gate lines (e.g.: the plurality of gate lines G1~G[N]). The detecting signal source 120 is coupled to each of the plurality of pixel circuits under test (e.g.: the pixel circuit under test P1~ the pixel circuit under test P[N], the pixel circuit under test P[N+1]~ the pixel circuit under test P[2N], and the pixel circuit under test P[M]) and the plurality of data lines (e.g.: the plurality of data lines DL1~DL[N]) of the display panel 110, and is configured to generate a first detecting signal to each of the plurality of pixel circuits under test (e.g.: the pixel circuit under test P1~ the pixel circuit under test P[N], the pixel circuit under test P[N+1]~ the pixel circuit under test P[2N], and the pixel circuit under test P[M]) and each of the plurality of data lines (e.g.: the plurality of data lines DL1~DL[N]) so that each of the plurality of pixel circuits under test generates a detection result signal to the plurality of data lines (e.g.: the plurality of data lines DL1~DL[N]) according to the first detecting signal and a second detecting signal.

Furthermore, the detecting signal source 120 is configured to determine whether each of the plurality of pixel circuits under test is abnormal according to the detection result signal. If each of the plurality of pixel circuits under test is abnormal, the detecting signal source 120 is configured to lock the at least one of the pixel circuits under test which is abnormal according to a plurality of positioning points of the plurality of data lines and the plurality of gate lines (e.g.: a position of the pixel circuit under test P1~ the pixel circuit under test P[N], a position of the pixel circuit under test P[N+1]~ the pixel circuit under test P[2N], and a position of the pixel circuit under test P[M]).

In some embodiments, please refer to FIG. 1, the plurality of data lines (e.g.: the plurality of data lines DL1~DL[N]) are aligned along a first direction (e.g.: a coordinate axis direction Y). The plurality of gate lines (e.g.: the plurality of gate lines G1~G[N]) are aligned along a second direction (e.g.: a coordinate axis direction X). The plurality of data lines (e.g.: the plurality of data lines DL1~DL[N]) are not parallel to the plurality of gate lines (e.g.: the plurality of gate lines G1~G[N]). The plurality of data lines (e.g.: the plurality of data lines DL1~DL[N]) and the plurality of gate lines (e.g.: the plurality of gate lines G1~G[N]) intersect to form the plurality of positioning points. It should be noted that the plurality of data lines (e.g.: the plurality of data lines DL1~DL[N]) are configured to locate the plurality of pixel circuits under test in the coordinate axis direction X. The plurality of gate lines (e.g.: the plurality of gate lines G1~G[N]) are configured to locate the plurality of pixel circuits under test in the coordinate axis direction Y.

Then, the plurality of pixel circuits under test (e.g.: the pixel circuit under test P1~ the pixel circuit under test P[N], the pixel circuit under test P[N+1]~ the pixel circuit under test P[2N], and the pixel circuit under test P[M]) are located at the plurality of positioning points respectively.

Figure 2:
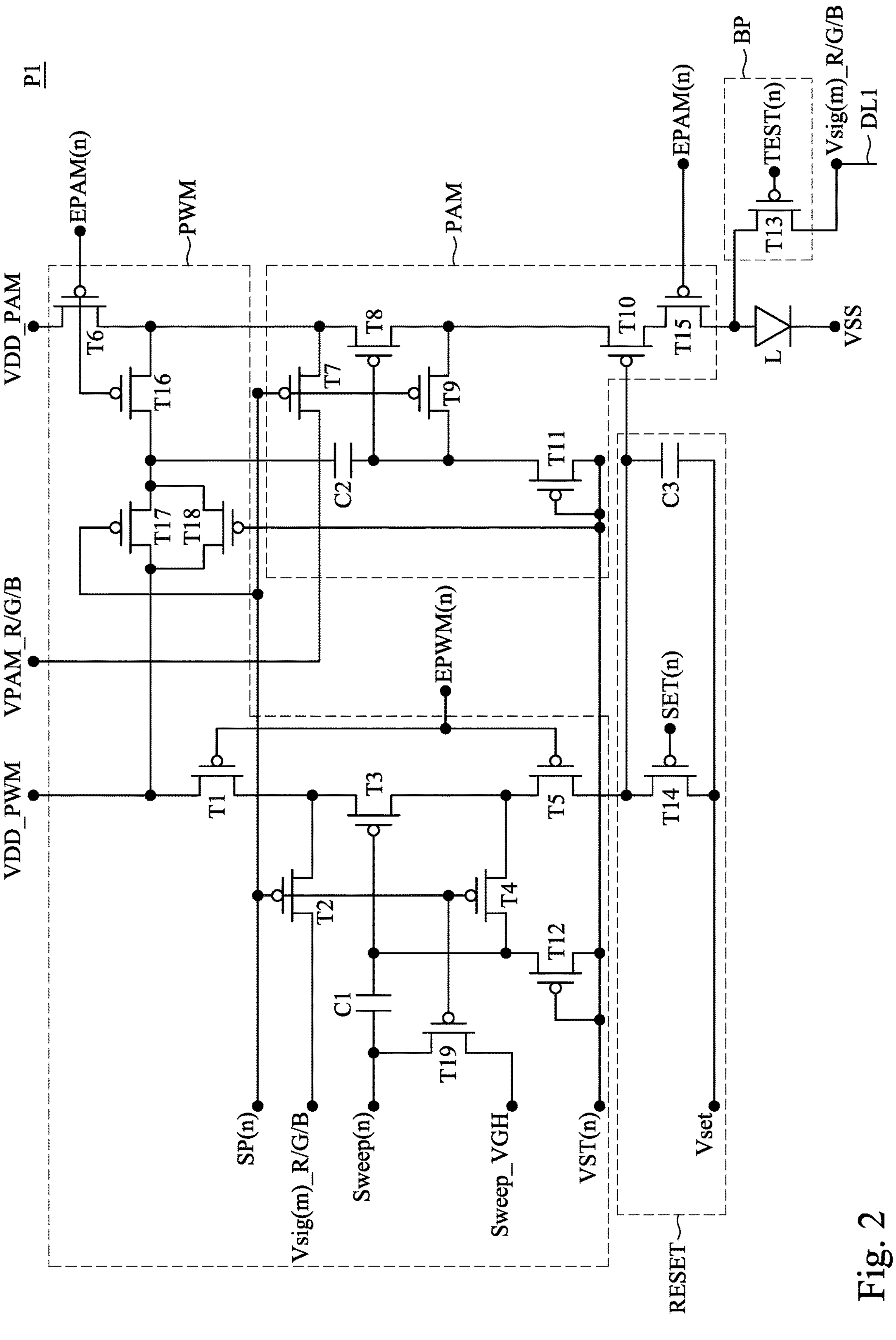
FIG. 2 depicts a schematic diagram of a pixel circuit under test of a display panel according to some embodiments of the present disclosure.

FIG. 2 depicts a schematic diagram of the pixel circuit under test P1 of the display panel 110 of the display device 100 corresponding to FIG. 1 according to some embodiments of the present disclosure. In some embodiments, please refer to FIG. 1 and FIG. 2, a circuit structure of each of the pixel circuit under test P2~ the pixel circuit under test P[N], the pixel circuit under test P[N+1]~ the pixel circuit under test P[2N], and the pixel circuit under test P[M] is the same as circuit structure of the pixel circuit under test P1. Subsequent explanation content will be explained with the circuit structure of the pixel circuit under test P1.

In some embodiments, in order to facilitate the understanding of a circuit structure of all pixel circuits under test of the present disclosure, please refer to FIG. 1 and FIG. 2 together. In some embodiments, please refer to FIG. 1, the display panel 110 includes a data line DL1 and the pixel circuit under test P1.

Then, please refer to FIG. 1 and FIG. 2, the pixel circuit under test P1 is coupled to the data line DL1, and is configured to receive a first detecting signal Vsig(m)_R/G/B (receiving from the upper left corner of circuit as shown in FIG. 2) from the detecting signal source 120. The pixel circuit under test P1 is configured to generate a driving current to read the first detecting signal Vsig(m)_R/G/B (outputting from the lower right corner of the circuit in FIG. 2). The pixel circuit under test P1 is configured to receive a second detecting signal from a pixel data signal source VPAM_R/G/B. The pixel circuit under test P1 is configured to generate a detection result signal according to the first detecting signal Vsig(m)_R/G/B and the second detecting signal.

Furthermore, please refer to FIG. 1 and FIG. 2. The pixel circuit under test P1 includes a luminous element L and a bypass circuit BP. The luminous element L is configured to emit a light according to the driving current. The bypass circuit BP is coupled to the luminous element L and the data line DL1, and is configured to transmit the detection result signal to detecting signal source 120 through the data line DL1 according to the test control signal so that the detecting signal source 120 determines whether the pixel circuit under test P1 is abnormal. It should be noted that the bypass circuit BP is configured to bypass the detection result signal to the data line DL1, at this time, the luminous element L does not emit a light.

In some embodiments, the bypass circuit BP includes a detecting transistor T13. The detecting transistor T13 is coupled to the luminous element L and the data line DL1, and is configured to transmit the detection result signal to the data line DL1 according to the test control signal.

In some embodiments, the pixel circuit under test P1 further includes a pulse-width modulation circuit PWM, a pulse-amplitude modulation circuit PAM, and a reset circuit RESET.

In some embodiments, the pulse-width modulation circuit PWM is coupled to the detecting signal source 120 of FIG. 1 and the first control signal source EPWM(n), and is configured to drive according to a first control signal of the first control signal source EPWM(n).

In some embodiments, the pulse-amplitude modulation circuit PAM is coupled to the luminous element L, the detecting transistor T13, the pulse-width modulation circuit PWM, the pixel data signal source VPAM_R/G/B, and a second control signal source EPAM(n), and is configured to drive according to a second control signal of the second control signal source EPAM(n).

In some embodiments, each of the pulse-width modulation circuit PWM and the pulse-amplitude modulation circuit PAMs coupled to an initial signal source VST(n). Each of the pulse-width modulation circuit PWM and the pulse-amplitude modulation circuit PAM is coupled to a writing signal source SP(n).

In some embodiments, please start form a top end and a right end of each of an element shown in the figure as a first end, the detecting transistor T13 includes a first end, a second end, and a control end. The first end of the detecting transistor T13 is coupled to the pulse-amplitude modulation circuit PAM. The second end of the detecting transistor T13 is coupled to the data line DL1. The control end of the detecting transistor T13 is coupled to a test control signal source TEST(n), and is configured to receive the test control signal of the test control signal source TEST(n) so as to be turned on in response to the test control signal to transmit the detection result signal to the data line DL1.

In some embodiments, the pulse-width modulation circuit PWM includes a first capacitor C1, transistors T1~T6, a transistor T12, and transistors T16~T19. The first capacitor C1 is indirectly coupled to the detecting signal source 120. The first capacitor C1 is configured to store the first detecting signal Vsig(m)_R/G/B.

In some embodiments, the pulse-amplitude modulation circuit PAM includes a second capacitor C2, transistors T7-T11, and a transistor T15. The second capacitor C2 is coupled to the pixel data signal source VPAM_R/G/B. The second capacitor C2 is configured to store the second detecting signal from the pixel data signal source VPAM_R/G/B.

In some embodiments, the reset circuit RESET includes a capacitor C3 and a transistor T14.

Figure 3:
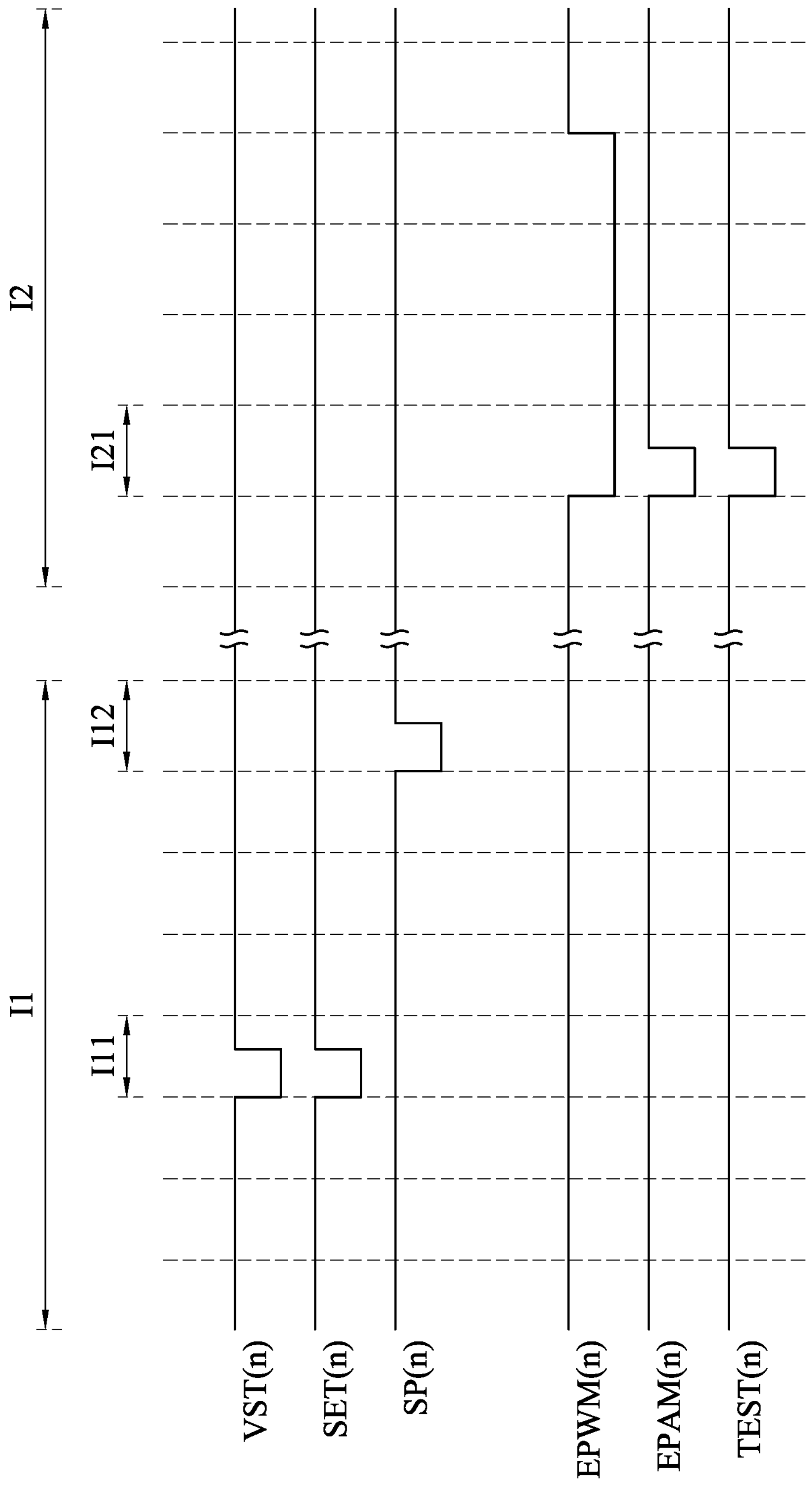
FIG. 3 depicts a signal timing diagram of a pixel circuit under test of a display panel according to some embodiments of the present disclosure.

In some embodiments, in order to facilitate the understanding of an operation of the pixel circuit under test P1 of FIG. 2, please refer to FIG. 3 together, FIG. 3 depicts a signal timing diagram of a pixel circuit under test P1 of a display panel 110 of FIG. 1. The pulse-width modulation circuit PWM and the pulse-amplitude modulation circuit PAM are configured to be reset according to an initial signal of the initial signal source VST(n) at a first sub-stage I11 of a first stage I1.

Then, the pulse-width modulation circuit PWM is configured to store the first detecting signal Vsig(m)_R/G/B to the first capacitor C1 of the pulse-width modulation circuit PWM according to a writing signal of the writing signal source SP(n) at a second sub-stage I12 of the first stage I1. The pulse-amplitude modulation circuit PAM is configured to store the second detecting signal of a pixel data signal source VPAM_R/G/B to the second capacitor C2 of the pulse-amplitude modulation circuit PAM according to the write signal of the writing signal source SP(n) at the second sub-stage I12 of the first stage I1.

Furthermore, the pulse-width modulation circuit PWM is turned on according to the first control signal at a second stage 12 to read the first detecting signal Vsig(m)_R/G/B of the first capacitor C1 of the pulse-width modulation circuit PWM, so as to output to the pulse-amplitude modulation circuit PAM. The pulse-amplitude modulation circuit PAM is turned on according to the second control signal at the second stage 12 to read the second detecting signal of the second capacitor C2 of the pulse-amplitude modulation circuit PAM so as to output the first detecting signal Vsig(m)_R/G/B and the second detecting signal through the detecting transistor T13 to the data line DL1. It should be noted that the first stage I1 is a programming stage of the display device 100 of FIG. 1. The second stage 12 is a detection stage of the display device 100 of FIG. 1.

Figure 4:
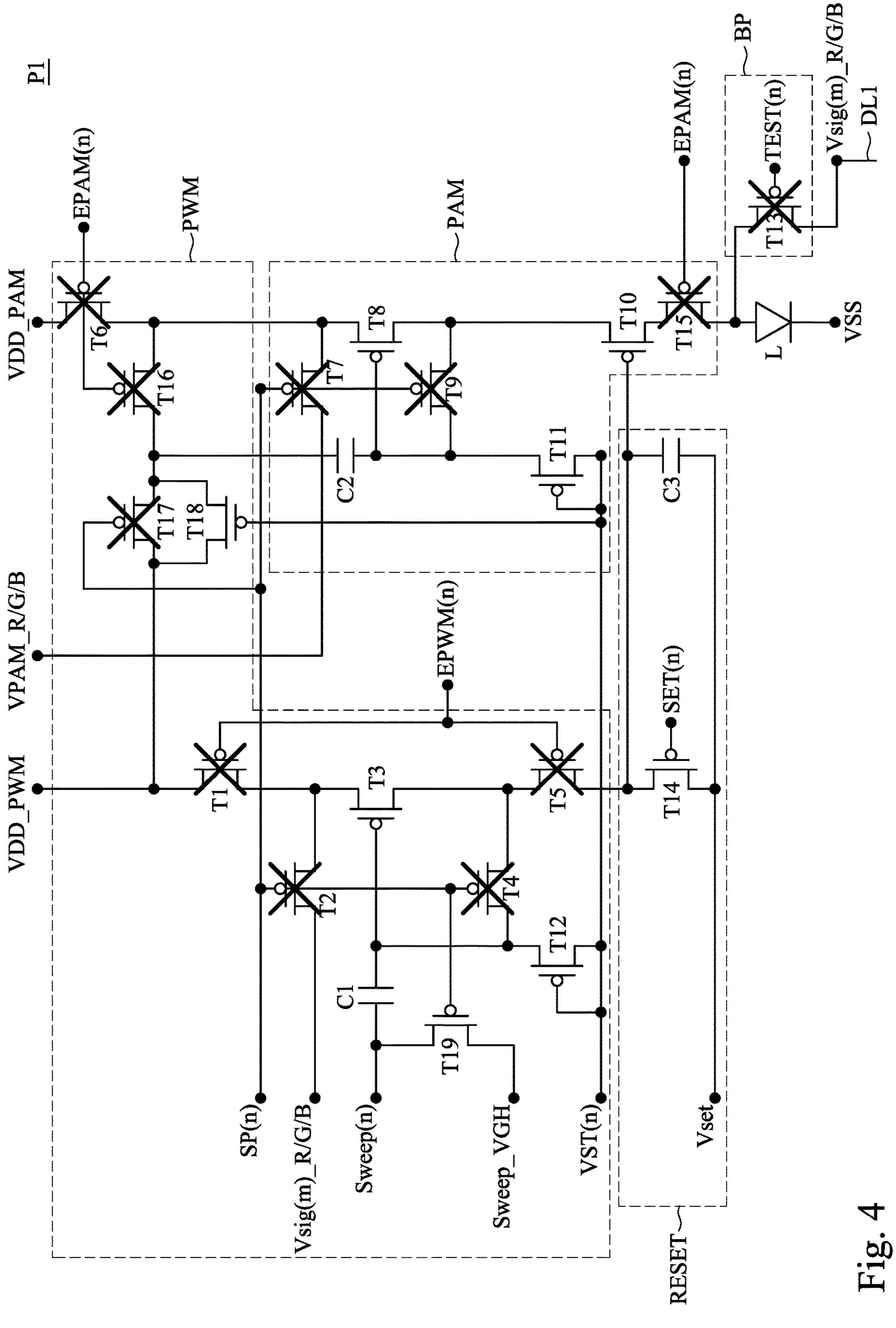
FIG. 4 depicts a state diagram of a pixel circuit under test of a display panel according to some embodiments of the present disclosure.

FIG. 4 depicts a state diagram of the pixel circuit under test P1 of the display panel 110 of the display device 100 corresponding to FIG. 1 according to some embodiments of the present disclosure. In some embodiments, please refer to FIG. 3 and FIG. 4, at the first sub-stage I11 of a first stage I1, the initial signal of the initial signal source VST(n) and a reset signal of a reset signal source SET(n) are at a low voltage level, the writing signal of the writing signal source SP(n) is at a high voltage level. The pulse-width modulation circuit PWM and the pulse-amplitude modulation circuit PAM are configured to be reset according to the initial signal of the initial signal source VST(n) at the first sub-stage I11 of the first stage I1.

In some embodiments, the initial signal of the initial signal source VST(n) resets the pulse-width modulation circuit PWM through the transistor T12 and the transistor T18 of the pulse-width modulation circuit PWM at the first sub-stage I11 of the first stage I1. The initial signal of the initial signal source VST(n) resets the pulse-amplitude modulation circuit PAM through the transistor T18 the transistor T11 of the pulse-amplitude modulation circuit PAM at the first sub-stage I11 of the first stage I1.

In some embodiments, the reset signal of a reset signal source SET(n) stores a reset voltage Vset to the capacitor C3 of the reset circuit RESET through the transistor T14 of the reset circuit RESET at the first sub-stage I11 of the first stage I1.

Figure 5:
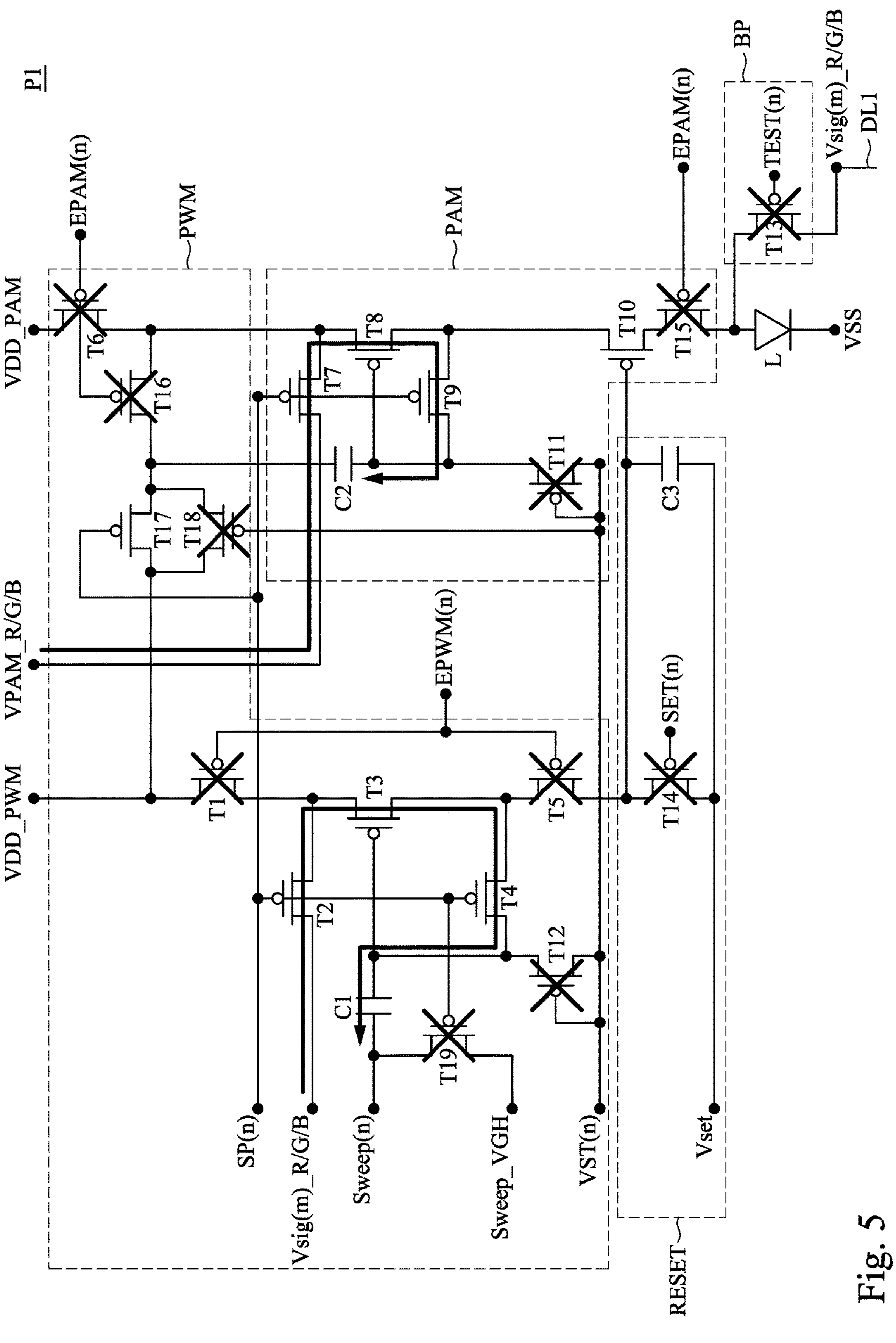
FIG. 5 depicts a state diagram of a pixel circuit under test of a display panel according to some embodiments of the present disclosure.

FIG. 5 depicts a state diagram of the pixel circuit under test P1 of the display panel 110 of the display device 100 corresponding to FIG. 1 according to some embodiments of the present disclosure. In some embodiments, please refer FIG. 3 and FIG. 5, at the second sub-stage I12 of the first stage I1, each of the writing signal of the writing signal source SP(n) and a sweep signal of a sweep signal source Sweep (n) is at a low voltage level, the initial signal of the initial signal source VST(n) is at a high voltage level. The pulse-width modulation circuit PWM is configured to store the first detecting signal Vsig(m)_R/G/B according to the writing signal of the writing signal source SP(n) at the second sub-stage I12 of the first stage I1. The pulse-amplitude modulation circuit PAM is configured to store the second detecting signal of the pixel data signal source VPAM_R/G/B according to the writing signal of the writing signal source SP(n) at the second sub-stage I12 of the first stage I1.

In some embodiments, please refer to FIG. 3 and FIG. 5, the writing signal of the writing signal source SP(n) writes the first detecting signal Vsig(m)_R/G/B through the transistors T2-T4 of the pulse-width modulation circuit PWM to store into the first capacitor C1 of the pulse-width modulation circuit PWM at the second sub-stage I12 of the first stage I1. The writing signal of the writing signal source SP(n) writes the second detecting signal through the transistors T7~T9 of the pulse-amplitude modulation circuit PAM to store into the second capacitor C2 of the pulse-amplitude modulation circuit PAM at the second sub-stage I12 of the first stage I1.

In some embodiments, please refer to FIG. 3, FIG. 4, and FIG. 5, since the capacitor C3 of the reset circuit RESET has stored the reset voltage Vset at the first sub-stage I11 of a first stage I1. At the second sub-stage I12 of a first stage I1, the transistor T10 of the pulse-amplitude modulation circuit PAM is turned on in response to the reset voltage Vset of the capacitor C3 of the reset circuit RESET.

Figure 6:
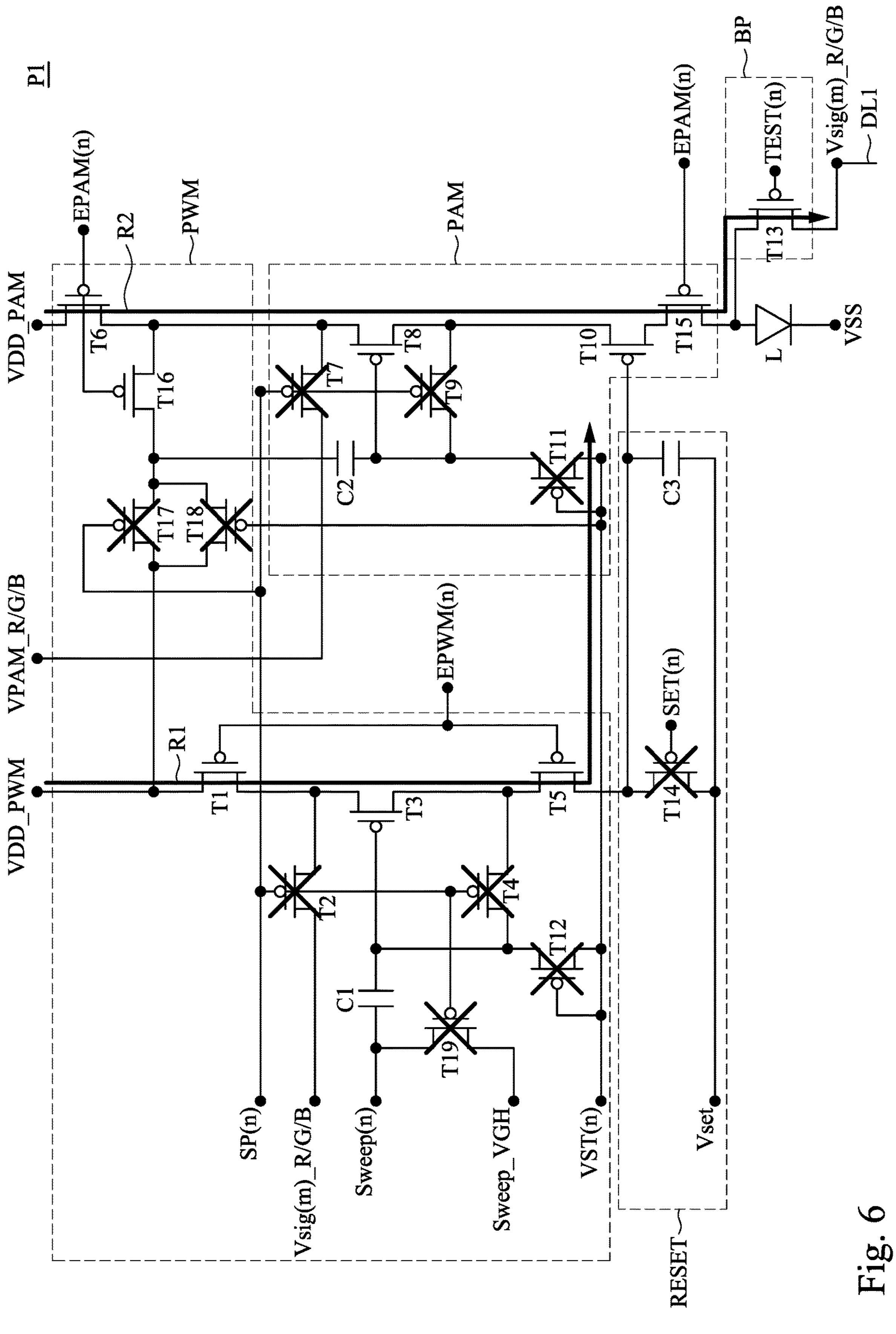
FIG. 6 depicts a state diagram of a pixel circuit under test of a display panel according to some embodiments of the present disclosure.

FIG. 6 depicts a state diagram of the pixel circuit under test P1 of the display panel 110 of the display device 100 corresponding to FIG. 1 according to some embodiments of the present disclosure. In some embodiments, please refer to FIG. 3 and FIG. 6, at a third sub-stage 121 of the second stage 12, the first control signal of the first control signal source EPWM(n), the second control signal of the second control signal source EPAM(n), the test control signal of the test control signal source TEST(n) and the sweep signal of the sweep signal source Sweep(n) are at a low voltage level, the writing signal of the writing signal source SP(n) and the initial signal of the initial signal source VST(n) are at a high voltage level.

In some embodiments, the first control signal of the first control signal source EPWM(n) forms a first current path R1 in the pulse-width modulation circuit PWM through the transistor T1, the transistor T3, and the transistor T5 of the pulse-width modulation circuit PWM.

In some embodiments, the second control signal of the second control signal source EPAM(n) forms a second current path R2 between a system high voltage source VDD_PAM and the data line DL1 through the transistor T6 of the pulse-width modulation circuit PWM. The second current path R2 starts from the system high voltage source VDD_PAM, flows through the transistor T6 of the pulse-width modulation circuit PWM, the transistor T8, the transistor T10, and transistor of the pulse-amplitude modulation circuit PAM, and the detecting transistor T13 of the bypass circuit BP, and finally flows to the data line DL1.

In some embodiments, the first detecting signal Vsig(m)_R/G/B of the first capacitor C1 of the pulse-width modulation circuit PWM is read out along the first current path R1 by the driving current and collected into the second current path R2, then, the second detecting signal of the second capacitor C2 of the pulse-amplitude modulation circuit PAM is read out along the second current path R2, and the pixel circuit under test P1 is configured to generate the detection result signal according to the first detecting signal Vsig(m)_R/G/Band the second detecting signal.

Furthermore, the second control signal of the second control signal source EPAM(n) transmits the detection result signal through the transistor T15 of the pulse-width modulation circuit PWM and the test control signal of the test control signal source TEST(n) transmits the detection result signal through the detecting transistor T13 of the bypass circuit BP to the data line DL1 together.

In some embodiments, please refer to FIG. 1, the detecting signal source 120 is configured to lock the at least one of the plurality of pixel circuits under test (e.g.: the pixel circuit under test P1~ the pixel circuit under test P[N], the pixel circuit under test P[N+1]~ the pixel circuit under test P[2N], and the pixel circuit under test P[M]) which is abnormal through the plurality of positioning points of the plurality of data lines (e.g.: the plurality of data lines DL1~DL[N]), the plurality of gate lines (e.g.: the plurality of gate lines G1~G[N]) and the detection result signal.

Based on the above embodiments, the present disclosure provides a display panel and a display device to store detecting signals to a capacitor of pixel circuits under test and to set a bypass circuit on a luminous element of a pixel circuit under test. A bypass circuit is coupled to a data line to generate a driving current to read out detecting signals so that a detection signal source locks abnormal specific pixel circuits in a display panel.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the present disclosure. In view of the foregoing, it is intended that the present disclosure cover modifications and variations of the present disclosure provided they fall within the scope of the following claims.

What is claimed is:

1. A display panel, comprising:
- a data line; and
- a pixel circuit under test, coupled to the data line, and configured to receive a first detecting signal from a detecting signal source and receive a second detecting signal from a pixel data signal source, wherein the pixel circuit under test is configured to generate a driving current to read the first detecting signal and the second detecting signal so as to generate a detection result signal, wherein the pixel circuit under test comprises:
- a luminous element, configured to emit a light according to the driving current;
- a bypass circuit, coupled to the luminous element and the data line, and configured to transmit the detection result signal to the detecting signal source through the data line according to a test control signal so that the detecting signal source determines whether the pixel circuit under test is abnormal; and
- a pulse-width modulation circuit, coupled to the detecting signal source and a first control signal source, and configured to drive according to a first control signal of the first control signal source.

2. The display panel of claim 1, wherein the bypass circuit comprises:
- a detecting transistor, coupled to the luminous element and the data line, and configured to transmit the detection result signal to the data line according to the test control signal.

3. The display panel of claim 2, wherein the pixel circuit under test further comprises:
- a pulse-amplitude modulation circuit, coupled to the luminous element, the detecting transistor, the pulse-width modulation circuit, the pixel data signal source, and a second control signal source, and configured to drive according to a second control signal of the second control signal source.

4. The display panel of claim 3, wherein the detecting transistor comprises:
- a first end, coupled to the pulse-amplitude modulation circuit;
- a second end, coupled to the data line; and
- a control end, coupled to a test control signal source, and configured to receive the test control signal of the test control signal source so as to be turned on in response to the test control signal to transmit the detection result signal to the data line.

5. The display panel of claim 4, wherein each of the pulse-width modulation circuit and the pulse-amplitude modulation circuit is coupled to an initial signal source, wherein the pulse-width modulation circuit and the pulse-amplitude modulation circuit are configured to be reset according to an initial signal of the initial signal source at a first sub-stage of a first stage.

6. The display panel of claim 5, wherein each of the pulse-width modulation circuit and the pulse-amplitude modulation circuit is coupled to a writing signal source, wherein the pulse-width modulation circuit is configured to store the first detecting signal of the detecting signal source according to a writing signal of the writing signal source at a second sub-stage of the first stage, wherein the pulse-amplitude modulation circuit is configured to store the second detecting signal of the pixel data signal source according to the write signal of the writing signal source at the second sub-stage of the first stage.

7. The display panel of claim 6, wherein the pulse-width modulation circuit comprises a first capacitor, wherein the first capacitor is coupled to the detecting signal source, and is configured to store the first detecting signal at the second sub-stage of the first stage, wherein the pulse-amplitude modulation circuit comprises a second capacitor, wherein the second capacitor is coupled to the pixel data signal source, and is configured to store the second detecting signal at the second sub-stage of the first stage.

8. The display panel of claim 7, wherein the pulse-width modulation circuit is turned on according to the first control signal at a second stage to read the first detecting signal of the first capacitor of the pulse-width modulation circuit so as to output to the pulse-amplitude modulation circuit, wherein the pulse-amplitude modulation circuit is turned on according to the second control signal at the second stage to read the second detecting signal of the second capacitor of the pulse-amplitude modulation circuit so as to output the first detecting signal and the second detecting signal through the detecting transistor to the data line.

9. The display panel of claim 1, further comprising:

a gate line, coupled to the pixel circuit under test, wherein the data line is not parallel to the gate line.

10. A display device, comprising:

a display panel, comprising:

a plurality of data lines;

a plurality of gate lines; and a plurality of pixel circuits under test, coupled to the plurality of data lines and the plurality of gate lines respectively; and a detecting signal source, coupled to each of the plurality of pixel circuits under test and the plurality of data lines of the display panel, and configured to generate a first detecting signal to each of the plurality of pixel circuits under test so that each of the plurality of pixel circuits under test generates a detection result signal to the plurality of data lines according to the first detecting signal and a second detecting signal, wherein the detecting signal source is configured to determine whether each of the plurality of pixel circuits under test is abnormal according to the detection result signal, wherein if each of the plurality of pixel circuits under test is abnormal, the detecting signal source is configured to lock the at least one of the plurality of pixel circuits under test which is abnormal according to a plurality of positioning points of the plurality of data lines and the plurality of gate lines.

11. The display device of claim 10, wherein the plurality of data lines are aligned along a first direction, wherein the plurality of gate lines are aligned along a second direction, wherein the plurality of data lines are not parallel to the plurality of gate lines, wherein the plurality of data lines and the plurality of gate lines intersect to form the plurality of positioning points.

12. The display device of claim 11, wherein the plurality of pixel circuits under test are located at the plurality of positioning points respectively.

13. The display device of claim 10, wherein each of the plurality of pixel circuits under test comprises:

a luminous element, configured to emit a light; and a detecting transistor, coupled to the luminous element and at least one of the plurality of data lines, and configured to output the detection result signal to the at least one of the plurality of data lines according to a test control signal.

14. The display device of claim 13, wherein each of the plurality of pixel circuits under test further comprises:

a pulse-width modulation circuit, coupled to the detecting signal source and a first control signal source, and configured to drive according a first control signal of the first control signal source.

15. The display device of claim 14, wherein each of the plurality of pixel circuits under test further comprises:

a pulse-amplitude modulation circuit, coupled to the luminous element, the detecting transistor, the pulse-width modulation circuit, a pixel data signal source, and a second control signal source, and configured to drive according to a second control signal of the second control signal source.

16. The display device of claim 15, wherein the detecting transistor comprises:

a first end, coupled to the pulse-amplitude modulation circuit;

a second end, coupled to the at least one of the plurality of data lines; and a control end, coupled to a test control signal source, and configured to receive the test control signal of the test control signal source to be turned on in response to the test control signal to transmit the detection result signal to the at least one of the plurality of data lines.

17. The display device of claim 16, wherein each of the pulse-width modulation circuit and the pulse-amplitude modulation circuit is coupled to an initial signal source, wherein the pulse-width modulation circuit and the pulse-amplitude modulation circuit are configured to be reset according to an initial signal of the initial signal source at a first sub-stage of a first stage.

18. The display device of claim 17, wherein each of the pulse-width modulation circuit and the pulse-amplitude modulation circuit is coupled to a writing signal source, wherein the pulse-width modulation circuit is configured to store the first detecting signal of the detecting signal source to a first capacitor of the pulse-width modulation circuit according to a writing signal of the writing signal source at a second sub-stage of the first stage, wherein the pulse-amplitude modulation circuit is configured to store the second detecting signal of a pixel data signal source to a second capacitor of the pulse-amplitude modulation circuit according to the write signal of the writing signal source at the second sub-stage of the first stage.

19. The display device of claim 18, wherein the pulse-width modulation circuit is turned on according to the first control signal at a second stage to read the first detecting signal of the first capacitor of the pulse-width modulation circuit so as to output to the pulse-amplitude modulation circuit, wherein the pulse-amplitude modulation circuit is turned on according to the second control signal at the second stage to read the second detecting signal of the second capacitor of the pulse-amplitude modulation circuit so as to output the first detecting signal and the second detecting signal through the detecting transistor to the at least one of the plurality of data lines.

* * * * *